US011601159B2

(12) United States Patent
Khoshnevisan et al.

(10) Patent No.: US 11,601,159 B2
(45) Date of Patent: Mar. 7, 2023

(54) SWITCHING BETWEEN DIFFERENT CONFIGURATIONS OF FREQUENCY AND BEAM HOPPING FOR SINGLE-BEAM AND MULTI-BEAM PUCCH

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/406,621

(22) Filed: Aug. 19, 2021

(65) Prior Publication Data

US 2022/0094389 A1 Mar. 24, 2022

Related U.S. Application Data

(60) Provisional application No. 63/081,112, filed on Sep. 21, 2020.

(51) Int. Cl.
*H04B 1/713* (2011.01)
*H04W 72/04* (2009.01)
*H04W 72/044* (2023.01)

(52) U.S. Cl.
CPC .......... *H04B 1/713* (2013.01); *H04W 72/046* (2013.01)

(58) Field of Classification Search
CPC ........ H04B 1/713; H04B 7/12; H04B 7/0404; H04B 7/0408; H04W 72/046; H04L 5/0012; H04L 5/0053
See application file for complete search history.

(56) References Cited

U.S. PATENT DOCUMENTS

| 2018/0323932 A1* | 11/2018 | Huang ................... H04B 1/713 |
| 2019/0280734 A1* | 9/2019 | Park .................. H04W 72/0413 |
| 2020/0053721 A1 | 2/2020 | Cheng et al. |

FOREIGN PATENT DOCUMENTS

| WO | 2019159300 A1 | 8/2019 |
| WO | 2020020128 A1 | 1/2020 |

OTHER PUBLICATIONS

International Search Report and Written Opinion—PCT/US2021/047007—ISA/EPO—dated Nov. 29, 2021.

(Continued)

*Primary Examiner* — Sung S Ahn
(74) *Attorney, Agent, or Firm* — Procopio, Cory, Hargreaves & Savitch LLP

(57) ABSTRACT

An apparatus may determine a mode in association with frequency/beam hopping. The mode may be configured semi-statically through RRC signaling and/or dynamically through a MAC-CE. The apparatus may determine the mode based on the RRC signaling/MAC-CE in order to switch between different configurations of frequency and beam hopping for single-beam and multi-beam PUCCH transmissions. The apparatus is configured to receive a PUCCH resource IE for a PUCCH resource indicating a PUCCH resource intra-slot frequency hopping configuration. The apparatus is configured to determine whether multiple PUCCH beams are activated for the PUCCH resource. The apparatus is configured to determine a mode for frequency hopping and beam hopping for the PUCCH resource based on at least one of the PUCCH resource intra-slot frequency hopping configuration, or the determination whether multiple PUCCH beams are activated. The apparatus is configured to transmit on the PUCCH resource based on the determined mode.

30 Claims, 9 Drawing Sheets

(56) References Cited

OTHER PUBLICATIONS

NTT DOCOMO., et al: "Update PUCCH and PUSCH Configuration", 3GPP Draft; R5-184620, Update PUCCH and PUSCH Configuration, 3rd Generation Partnership Project (3GPP), vol. RAN WG5, No. Gothenburg, Sweden; Aug. 20, 2018-Aug. 24, 2018, Aug. 10, 2018 (Aug. 10, 2018), XP051586470, 10 pages, Retrieved from the Internet: URL: http://www.3gpp.org/ftp/tsg%5Fran/WG5%5FTest%5Fex%2DT1/TGR5%5F80%5FGothenburg/Docs/R5%2D184620%2Ezip [retrieved on Aug. 10, 2018] chapter 4.6.3; p. 2 p. 3.

Qualcomm Incorporated: "Enhancements on Multi-TRP for PDCCH, PUCCH and PUSCH", 3GPP Draft, 3GPP TSG-RAN WG1 Meeting #102-e, R1-2006791, 3rd Generation Partnership Project (3GPP), vol. RAN WG1, No. e-Meeting, Aug. 17, 2020-Aug. 28, 2020 Aug. 8, 2020, XP051918241, pp. 1-14, Retrieved from Internet: URL: https://ftp.3gpp.org/tsg_ran/WG1_RL1/TSGR1_102-e/Docs/R1-2006791.zip [retrieved on Aug. 8, 2020] p. 1, 1 Introduction pp. 2-4, 2.2 Different Approaches for Multi-TCI State, pp. 11-12, 4 PUSCH.

\* cited by examiner

| 800 | | | |
|---|---|---|---|
| 802 | Options 1, 2 | Mode 0 | (1) One Beam Activated and (2) intraSlotFrequencyHopping Disabled |
| 804 | Option 3 | Mode 0 | (1) One Beam Activated and (2) mode information indicates no intra-slot frequency hopping |
| 806 | Options 1, 2 | Mode 1 | (1) One Beam Activated and (2) intraSlotFrequencyHopping Enabled |
| 808 | Option 3 | Mode 1 | (1) One Beam Activated and (2) mode information indicates intra-slot frequency hopping |
| 810 | Option 1 | Mode 2 | (1) Plurality of Beams Activated |
| 812 | Option 2 | Mode 2 | (1) Plurality of Beams Activated, and (2) intraSlotFrequencyHopping Disabled or startingPRB=secondHopPRB |
| 814 | Option 3 | Mode 2 | (1) Plurality of Beams Activated, and (2) mode information indicates no frequency hopping and beam hopping |
| 816 | Option 2 | Mode 3 | (1) Plurality of Beams Activated, and (2) intraSlotFrequencyHopping Enabled and startingPRB≠secondHopPRB |
| 818 | Option 3 | Mode 3 | (1) Plurality of Beams Activated, and (2) mode information indicates frequency hopping and beam hopping |
| 820 | Option 3 | Mode 3 | (1) Plurality of Beams Activated, (2) intraSlotFrequencyHopping Enabled and startingPRB≠secondHopPRB, and (3) mode information indicates single set of hops |
| 822 | Option 3 | Mode 4 | (1) Plurality of Beams Activated, (2) intraSlotFrequencyHopping Enabled and startingPRB≠secondHopPRB, and (3) mode information indicates multiple sets of hops |

FIG. 8

SWITCHING BETWEEN DIFFERENT CONFIGURATIONS OF FREQUENCY AND BEAM HOPPING FOR SINGLE-BEAM AND MULTI-BEAM PUCCH

CROSS REFERENCE TO RELATED APPLICATION(S)

This application claims the benefit of and priority to U.S. Provisional Application Ser. No. 63/081,112, entitled "Switching Between Different Configurations of Frequency and Beam Hopping for Single-Beam and Multi-Beam PUCCH" and filed on Sep. 21, 2020, which is expressly incorporated by reference herein in its entirety.

TECHNICAL FIELD

The present disclosure relates generally to communication systems, and more particularly, to a method and an apparatus associated with switching between different configurations of frequency and beam hopping for single-beam and multi-beam physical uplink control channel (PUCCH) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method and an apparatus for determining a mode in association with frequency hopping and beam hopping is provided. The mode may be configured semi-statically through radio resource control (RRC) signaling or dynamically through a media access control (MAC) control element (CE) (MAC-CE). The apparatus may determine the mode based on the RRC signaling/MAC-CE in order to switch between different configurations of frequency and beam hopping for single-beam and multi-beam PUCCH transmissions.

In an aspect of the disclosure, a method, a computer-readable medium, and an apparatus are provided. The apparatus may be a device at a UE. The device may be a processor and/or a modem at a UE or the UE itself. The apparatus is configured to receive a PUCCH resource information element (IE) for a PUCCH resource indicating a PUCCH resource intra-slot frequency hopping configuration. The apparatus is further configured to determine whether multiple PUCCH beams are activated for the PUCCH resource. The apparatus is further configured to determine a mode for frequency hopping and beam hopping for the PUCCH resource based on at least one of the PUCCH resource intra-slot frequency hopping configuration, or the determination whether multiple PUCCH beams are activated. The apparatus is further configured to transmit on the PUCCH resource based on the determined mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram illustrating different options associated with the mode.

DETAILED DESCRIPTION

Figure 1:
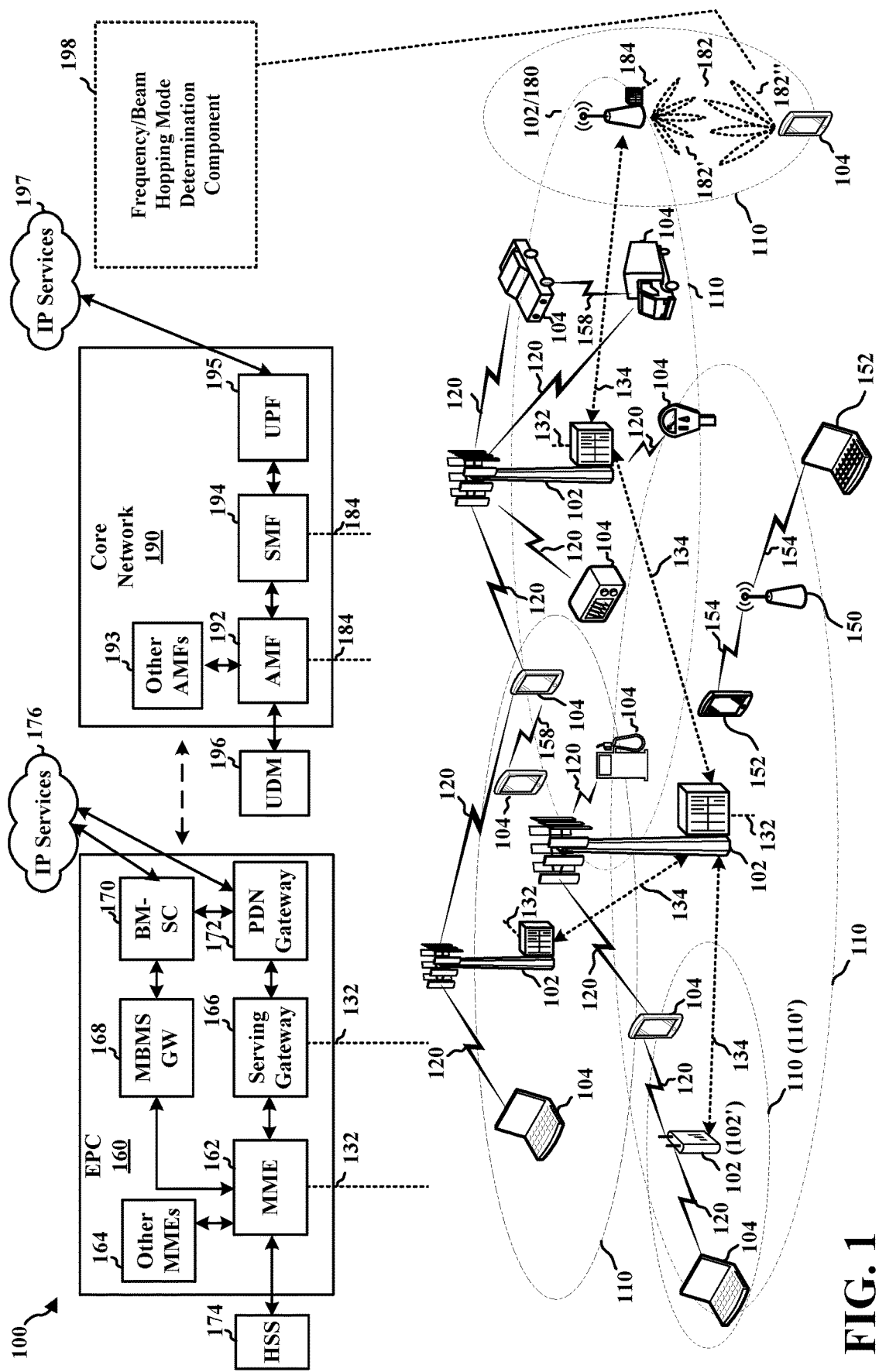
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a frequency/beam hopping mode determination component 198 that is configured to determine a mode based on RRC signaling and/or a MAC-CE in order to switch between different configurations of frequency and beam hopping for single-beam and multi-beam PUCCH transmissions.

Although the following description may be focused on 5G NR, the concepts described herein may be applicable to other similar areas, such as LTE, LTE-A, CDMA, GSM, and other wireless technologies.

Figure 2:
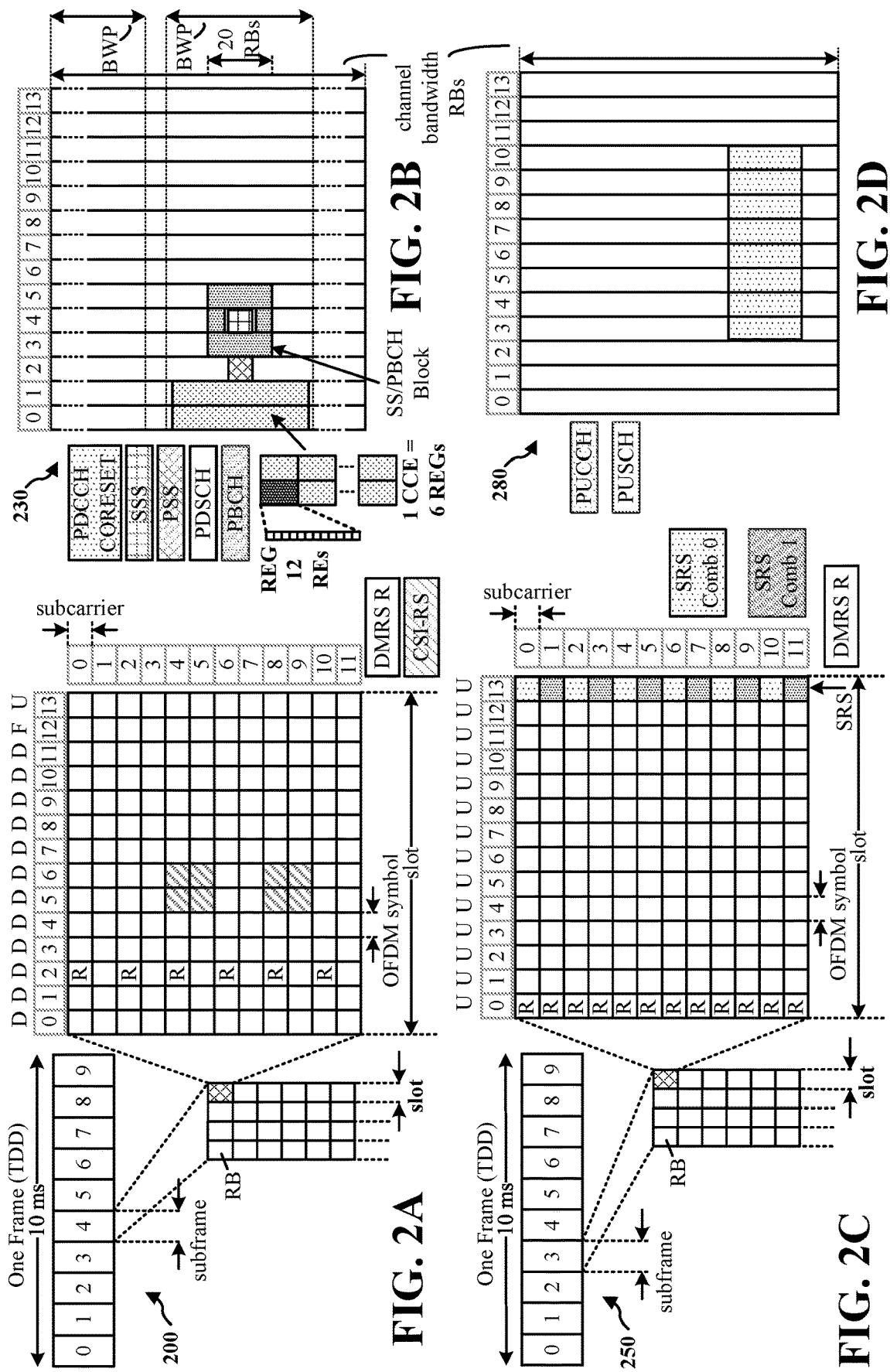
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
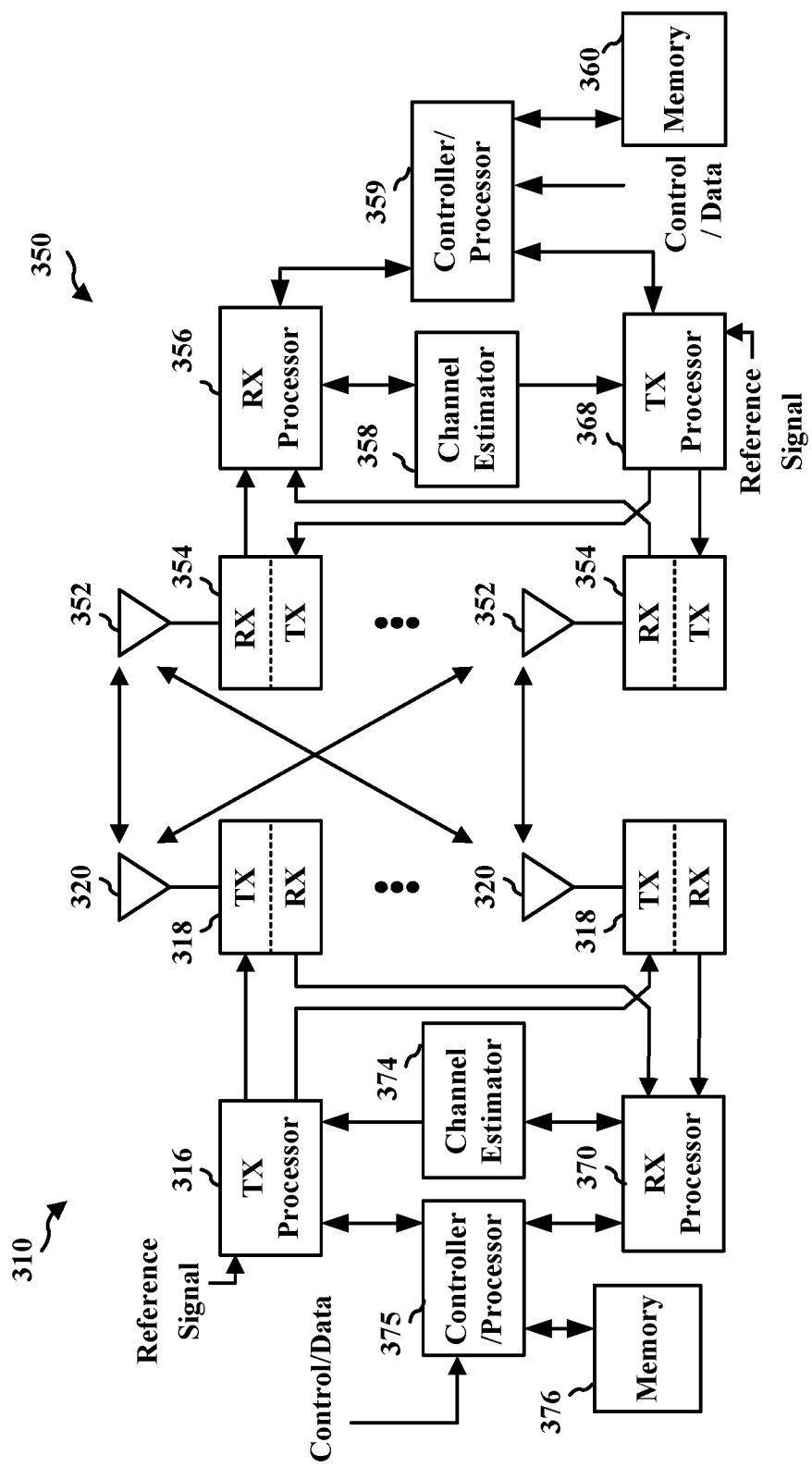
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Intra-slot frequency hopping within the same PUCCH resource in a slot may be enabled (configured per PUCCH resource). The intra-slot frequency hopping is time division multiplexed (TDMed) scheme that may improve reliability and robustness for PUCCH using multiple transmission reception points (TRPs) and/or multiple panels. In a first configuration, both inter-slot repetition and intra-slot repetition and/or intra-slot beam hopping may be supported. In a second configuration, only inter-slot repetition may be supported. Multiple PUCCH resources to repeat the same uplink control information (UCI) in both inter-slot repetition and intra-slot repetition may be used. In inter-slot repetition, one PUCCH resource may carry UCI, and one or more other PUCCH resources or the same PUCCH resource in another one or more slots may carry a repetition of the UCI. In intra-slot repetition, one PUCCH resource may carry UCI, and one or more other PUCCH resources or the same PUCCH resource in another one or more sub slots of the same slot may carry a repetition of the UCI. In intra-slot beam hopping, UCI may be transmitted in one PUCCH resource in which different sets of symbols have different beams.

For a PUCCH transmission with a PUCCH resource in a given slot, a UE may switch between different modes of operation with respect to frequency hopping and beam hopping. As discussed supra, a UE may be configured with the mode semi-statically through RRC signaling or dynamically through a MAC-CE. The UE may determine the mode based on the RRC signaling/MAC-CE in order to switch between the different configurations of frequency and beam hopping for single-beam and multi-beam PUCCH transmissions.

Figure 4:
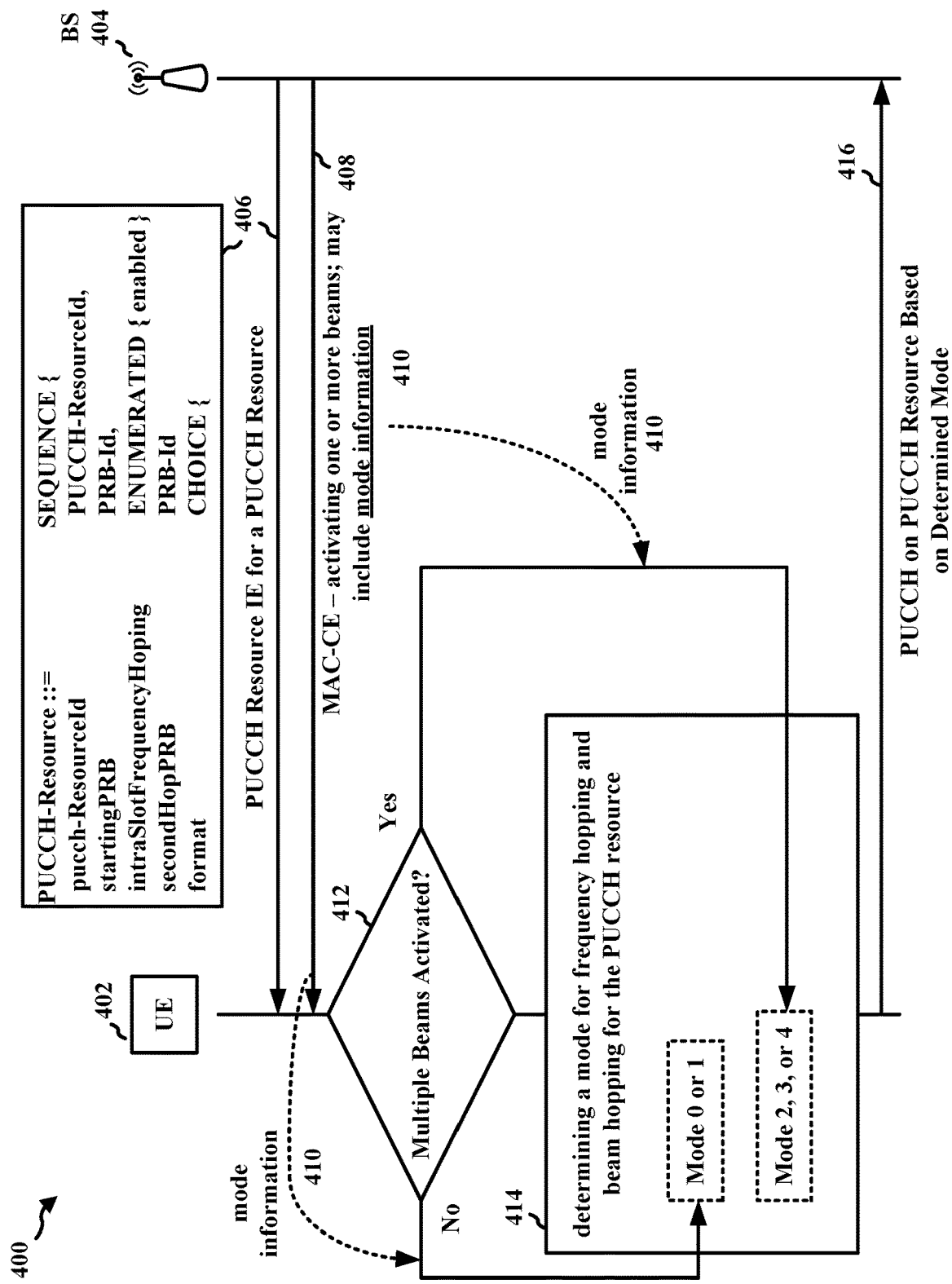
FIG. 4 is a call-flow diagram illustrating mode determination in association with switching between different configurations of frequency hopping and beam hopping.

FIG. 4 is a call-flow diagram 400 illustrating mode determination in association with switching between different configurations of frequency hopping and beam hopping. The base station 404 may be configured to provide at least one cell. The UE 402 may be configured to communicate with the base station 404. For example, in the context of FIG. 1, the base station 404 may correspond to the base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350.

A UE 402 may receive, from a base station 404, a PUCCH resource IE 406 for a PUCCH resource indicating a PUCCH resource intra-slot frequency hopping configuration. In one configuration, the PUCCH resource IE 406 may also indicate a starting physical resource block (PRB) and a second hop PRB (along with a PUCCH resource ID and a PUCCH format). In one configuration, the UE 402 may also receive a MAC-CE 408 activating one or more beams. In one configuration, the MAC-CE 408 may further include mode information 410 to allow the UE 402 to determine a mode for frequency hopping and beam hopping for the PUCCH resource. At 412, the UE 402 determines whether multiple PUCCH beams are activated for the PUCCH resource. In one configuration, the determination whether multiple PUCCH beams are activated may be based on the received MAC-CE. At 414, the UE 402 determines a mode for frequency hopping and beam hopping for the PUCCH resource based on at least one of the PUCCH resource intra-slot frequency hopping configuration, or the determination whether multiple PUCCH beams are activated. In one example, five or fewer modes 0, 1, 2, 3, 4 are available (some of the modes may be disabled/unsupported), and the UE 402 may select one of the available modes based on the determination whether multiple PUCCH beams are activated and some additional information, such as the PUCCH resource intra-slot frequency hopping configuration or the mode information 410. In another example, the UE 402 may select one of the available modes based on the determination whether multiple PUCCH beams are activated and one or more of the PUCCH resource intra-slot frequency hopping configuration, the starting PRB, the second hop PRB, and/or the mode information 410. Subsequently, the UE 402 may transmit a PUCCH 416 on the PUCCH resource based on the determined mode.

Figure 5:
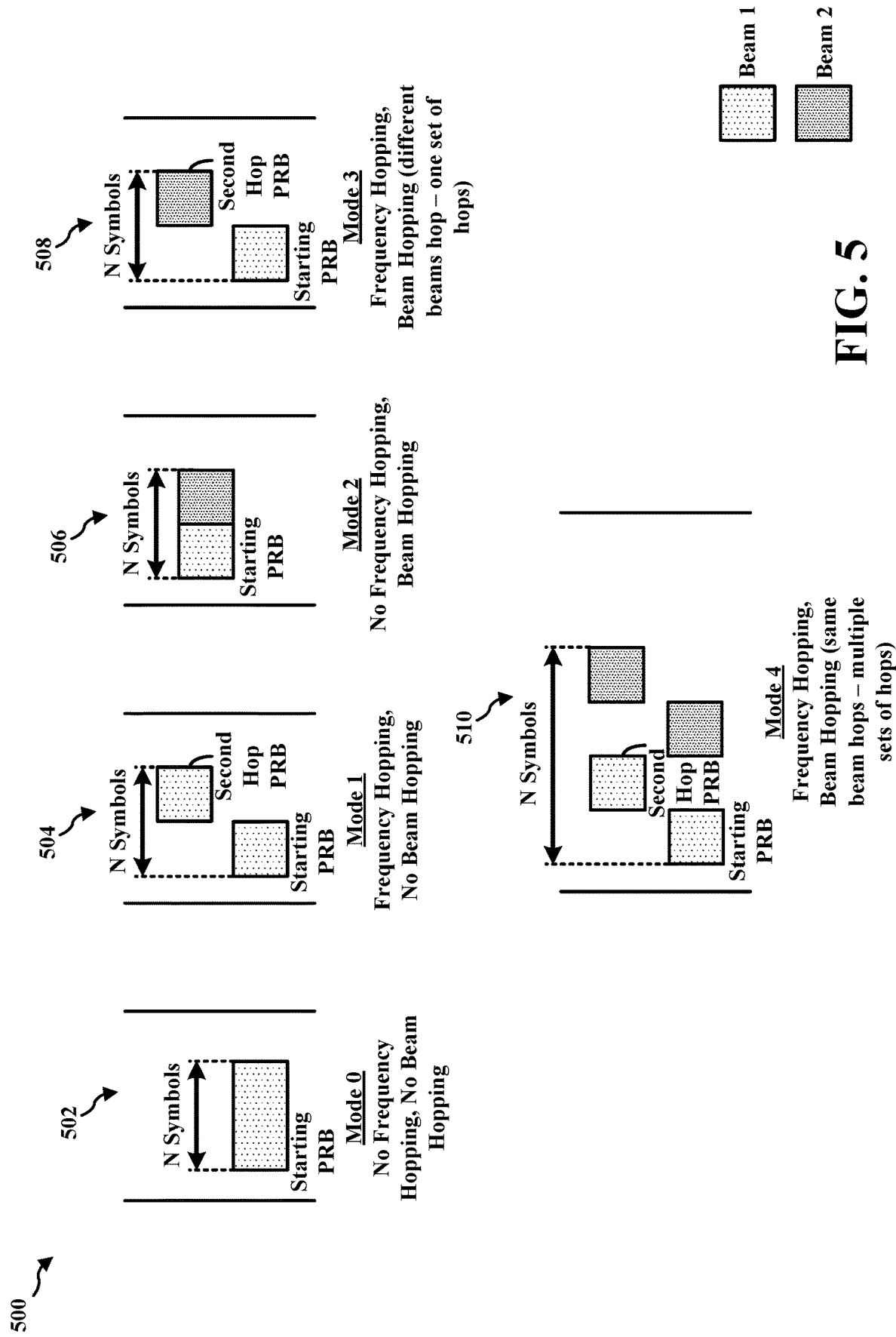
FIG. 5 is a diagram illustrating different modes for frequency hopping and beam hopping.

FIG. 5 is a diagram 500 illustrating different modes for frequency hopping and beam hopping. For a PUCCH transmission within a PUCCH resource in a given slot, the UE 402 may determine/switch between different modes of operations. In a mode 0 (first mode) 502, there is no frequency hopping and no beam hopping. The UE 402 may transmit the PUCCH for a first beam (beam 1) at the starting PRB within N symbols. In a mode 1 (second mode) 504, there is frequency hopping and no beam hopping. The UE 402 may transmit the PUCCH through a first beam (beam 1) at the starting PRB within [N/2] (floor of N/2) symbols and through the first beam (beam 1) at the second hop PRB within N−[N/2] symbols. In a mode 2 (third mode) 506, there is no frequency hopping and beam hopping. The UE 402 may transmit the PUCCH at the starting PRB through a first beam (beam 1) within [N/2] symbols and through a second beam (beam 2) within the subsequent N−[N/2] symbols. In a mode 3 (fourth mode) 508, there is frequency hopping and beam hopping, where different beams hop and there is one set of hops. The UE 402 may transmit the PUCCH through a first beam (beam 1) at the starting PRB within [N/2] symbols and through a second beam (beam 2) at the second hop PRB within N−[N/2] symbols. In one configuration, as illustrated by the diagram 508, when n beams are activated, the first number of hops equals n. In a mode 4 (fifth mode) 510, there is frequency hopping and beam hopping, where the same beams hop and there are multiple sets of hops. The UE 402 may transmit the PUCCH through a first beam (beam 1) at the starting PRB within [N/4] symbols and through the first beam (beam 1) at the second hop PRB within [N/2]−[N/4] symbols, and through a second beam (beam 2) within [N*3/4]−[N/2] symbols and through the second beam (beam 2) within N−[N*3/4] symbols.

The PUCCH resource IE 406 (including the startingPRB, secondHopPRB, and intraSlotFrequencyHopping fields) is configured semi-statically through RRC signaling, whereas the PUCCH beams are activated dynamically through a MAC-CE 408. The RRC configured PUCCH resource IE 406 and the beam activation through the MAC-CE 408 are per PUCCH resource. The UE 402 may determine whether the MAC-CE 408 activates one beam or a plurality of beams (e.g., two beams) for the PUCCH resource. If the MAC-CE 408 activates one beam, the UE 402 may determine the mode to be mode 0 or mode 1 depending on the RRC parameter intraSlotFrequencyHopping or based on additional mode information 410 that may be included in the MAC-CE 408. For example, the UE 402 may determine the mode to be mode 0 if intraSlotFrequencyHopping is disabled and to be mode 1 if intraSlotFrequencyHopping is enabled. For another example, if the UE 402 receives mode information 410 in the beam activation MAC-CE 408, the UE 402 may determine the mode to be mode 0 if the mode information 410 indicates no frequency hopping, and to be mode 1 if the mode information 410 indicates frequency hopping. If the MAC-CE 408 activates a plurality of beams, the UE 402 may determine the mode to be mode 2, mode 3, or mode 4 (which may or may not be supported/enabled). Herein, for simplicity in the discussion, the plurality of beams will be assumed to be two beams, but in general, the plurality of beams may be two or more beams.

If two beams (two PUCCH-spatialRelationInfo's) are activated for a PUCCH resource for intra-slot beam hopping, there are several possible options. In a first option, the RRC parameter secondHopPRB may be assumed to be the same as the first hop PRB (determined from the parameter startingPRB) even if a different value is configured through RRC. The MAC-CE 408 may allow the UE 402 to switch between modes 0, 1 and mode 2 based on whether one or two beams are activated for the PUCCH resource. In this option, modes 3 and 4 may be unsupported/disabled. In a second option, the RRC parameter intraSlotFrequencyHopping and/or SecondHopPRB may allow the UE 402 to determine whether mode 2 or more 3 is configured. If intraSlotFrequencyHopping is enabled and secondHopPRB is different than startingPRB, the UE 402 may determine that mode 3 is configured, otherwise the UE 402 may determine that mode 2 is configured. The MAC-CE 408 may allow the UE 402 to switch between modes 0, 1 and modes 2, 3 based on whether one or two beams are activated, but whether mode 2 or mode 3 is configured may depend on RRC signaling, which is slower than the MAC-CE 408. In this option, mode 4 may be unsupported/disabled. In a third option, the same MAC-CE 408 that activates the PUCCH beam(s) also provides mode information 410, which indicates which mode should be assumed among modes 0, 1, 2, 3, 4. The choice between modes 0, 1 and modes 2, 3, 4 may be based on whether the MAC-CE 408 activates one or two beams for the PUCCH resource. Another field in the MAC-CE 408, the mode information 410, may allow the UE 402 to determine the mode between modes 2, 3, 4 (or between modes 2, 3 if mode 4 is unsupported/disabled) if two beams are activated, and between modes 0, 1 if one beam is activated. The third option provides a flexible option, as the MAC-CE 408 is faster than RRC signaling.

Figure 6:
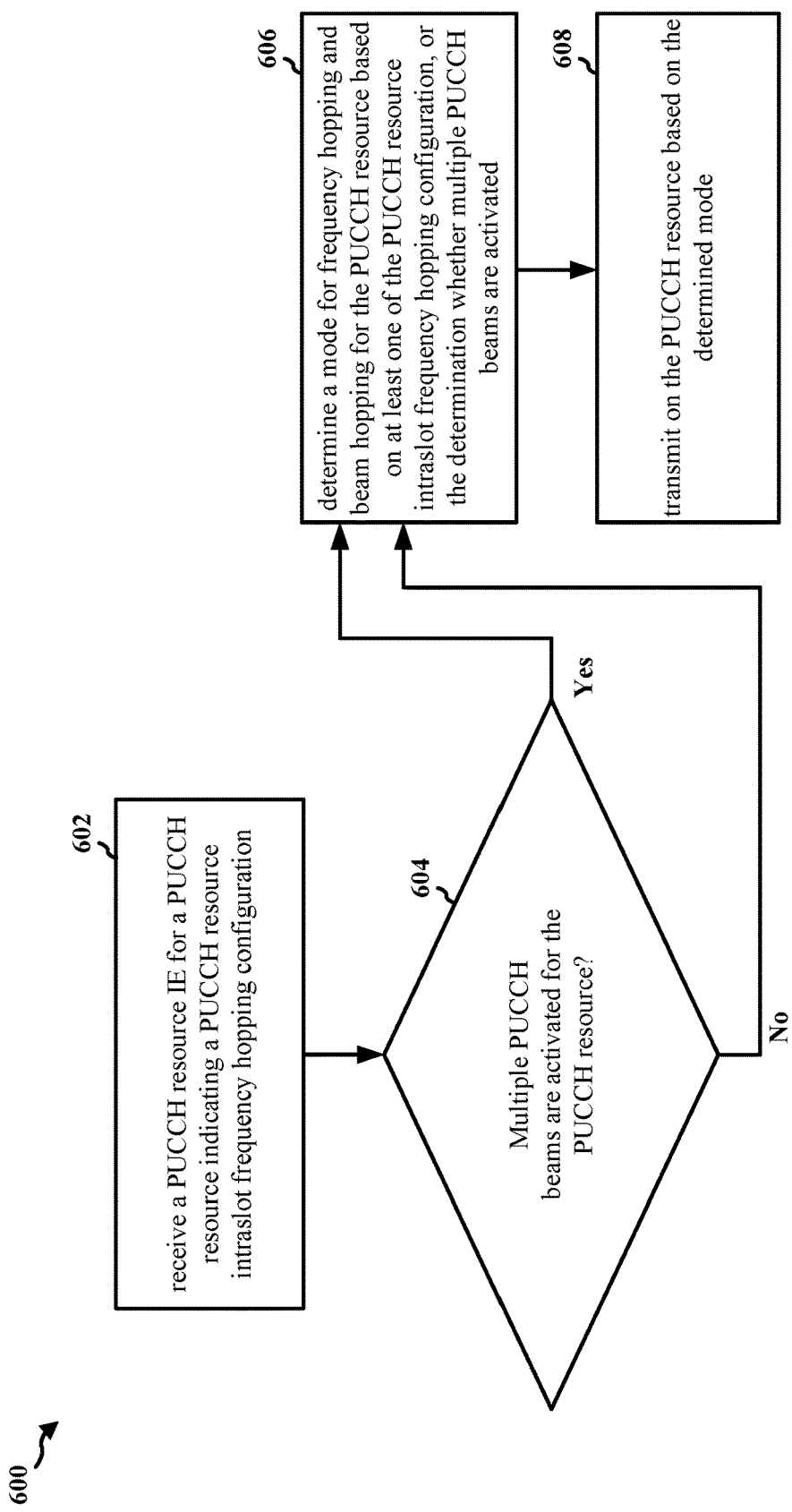
FIG. 6 is a flowchart of a method of wireless communication.

FIG. 6 is a flowchart 600 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to switch between different configurations of frequency and beam hopping for single-beam or multi-beam PUCCH transmissions.

At 602, the UE receives a PUCCH resource IE for a PUCCH resource indicating a PUCCH resource intra-slot frequency hopping configuration. For example, 602 may be performed by reception component 930 of apparatus 902. In one configuration, the PUCCH resource IE is received through RRC signaling. In one configuration, the PUCCH resource IE further indicates a PUCCH resource starting hop PRB configuration and a PUCCH resource second hop PRB configuration, and the mode for frequency hopping and beam hopping for the PUCCH resource is further determined based on the PUCCH resource starting hop PRB configuration and the PUCCH resource second hop PRB configuration.

At 604, the UE determines whether multiple PUCCH beams are activated for the PUCCH resource. For example, 604 may be performed by frequency/beam hopping mode determination component 940 of apparatus 902. In one configuration, a MAC-CE activates one or more beams, and the UE determines whether multiple PUCCH beams are activated based on the received MAC-CE.

At 606, the UE determines a mode for frequency hopping and beam hopping for the PUCCH resource. For example, 606 may be performed by frequency/beam hopping mode determination component 940 of apparatus 902. The UE determines a mode for frequency hopping and beam hopping for the PUCCH resource based on at least one of the PUCCH resource intra-slot frequency hopping configuration, or the determination whether multiple PUCCH beams are activated. In one configuration, the mode is determined to be no frequency hopping and no beam hopping when multiple beams are determined not to be activated and the PUCCH resource intra-slot frequency hopping configuration indicates that intra-slot frequency hopping for the PUCCH resource is disabled, as shown for example at 802 of FIG. 8. In one configuration, the mode is determined to be frequency hopping and no beam hopping when multiple beams are determined not to be activated and the PUCCH resource intra-slot frequency hopping configuration indicates that intra-slot frequency hopping for the PUCCH resource is enabled, as shown for example at 806 of FIG. 8. In one configuration, the mode is determined to be no frequency hopping and beam hopping when multiple beams are determined to be activated, as shown for example at 810 of FIG. 8. In such a configuration, the mode may be determined to be no frequency hopping and beam hopping despite whether the PUCCH resource intra-slot frequency hopping configuration is enabled or disabled. Accordingly, in one configuration, the PUCCH resource intra-slot frequency hopping configuration may be enabled, and in another configuration, the PUCCH resource intra-slot frequency hopping configuration may be disabled. In one configuration, the mode is determined to be no frequency hopping and beam hopping when multiple beams are determined to be activated, and the PUCCH resource intra-slot frequency hopping configuration is disabled or the PUCCH resource starting hop PRB configuration and the PUCCH resource second hop PRB configuration indicate the same PRB, as shown for example at 812 of FIG. 8. In one configuration, the mode is determined to be frequency hopping and beam hopping with a first number of hops when multiple beams are determined to be activated, the PUCCH resource intra-slot frequency hopping configuration is enabled, and the PUCCH resource starting hop PRB configuration and the PUCCH resource second hop PRB configuration indicate different PRBs, as shown for example at 816 of FIG. 8. In one configuration, as illustrated by the diagram 508, when n beams are activated, the first number of hops equals n.

At 608, the UE transmits on the PUCCH resource based on the determined mode. For example, 608 may be performed by transmission component 934 of apparatus 902.

Figure 7:
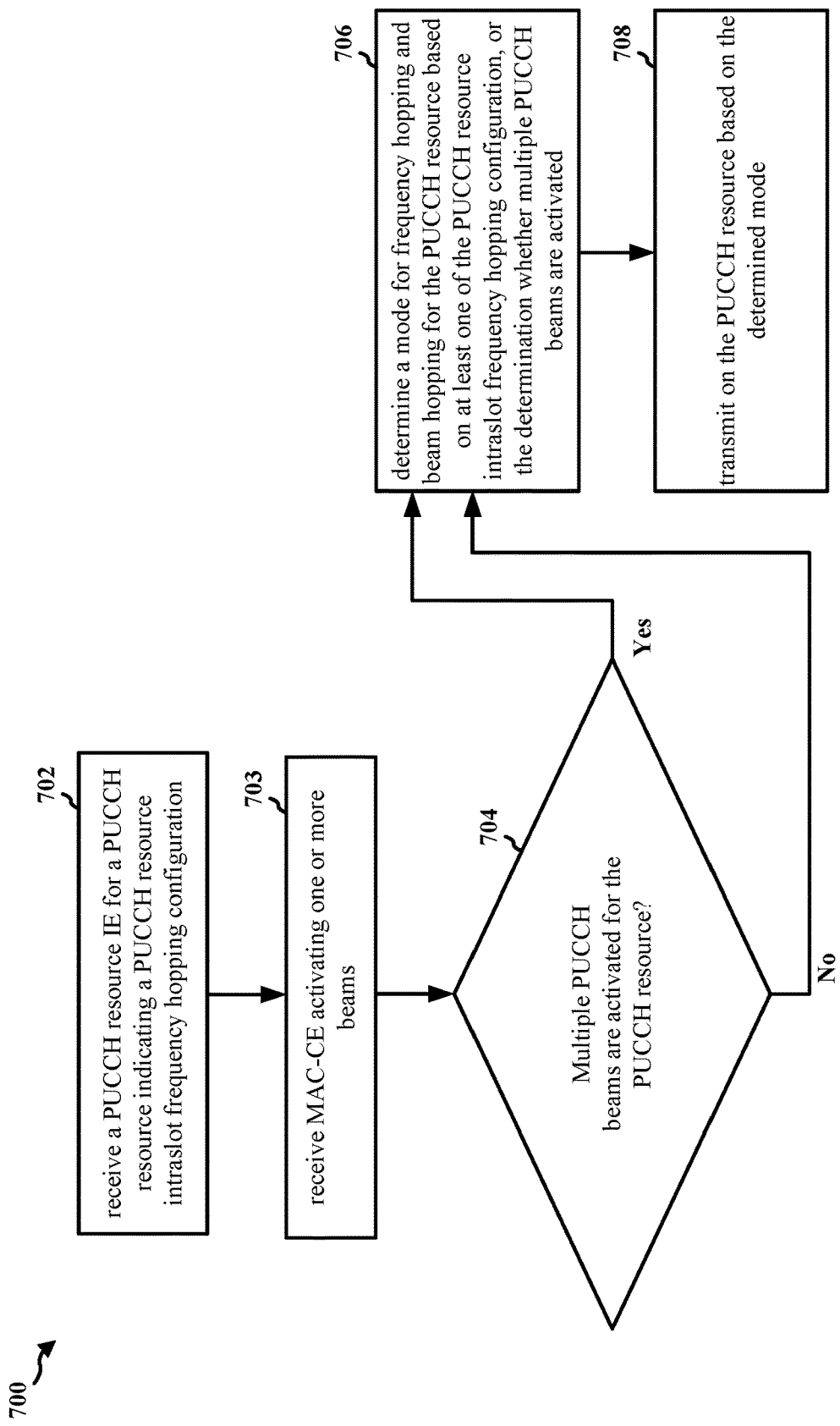
FIG. 7 is a flowchart of a method of wireless communication.

FIG. 7 is a flowchart 700 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to switch between different configurations of frequency and beam hopping for single-beam or multi-beam PUCCH transmissions.

At 702, the UE receives a PUCCH resource IE for a PUCCH resource indicating a PUCCH resource intra-slot frequency hopping configuration. For example, 702 may be performed by reception component 930 of apparatus 902. In one configuration, the PUCCH resource IE is received through RRC signaling. In one configuration, the PUCCH resource IE further indicates a PUCCH resource starting hop PRB configuration and a PUCCH resource second hop PRB configuration, and the mode for frequency hopping and beam hopping for the PUCCH resource is further determined based on the PUCCH resource starting hop PRB configuration and the PUCCH resource second hop PRB configuration.

At 703, the UE receives a MAC-CE activating one or more beams. For example, 703 may be performed by reception component 930 of apparatus 902. In one configuration, the UE receives the MAC-CE activating the one or more beams such that the determination whether multiple PUCCH beams are activated is based on the received MAC-CE. In one configuration, the UE receives a MAC-CE activating multiple PUCCH beams, the UE determines that multiple PUCCH beams are activated based on the received MAC-C. The MAC-CE indicates mode information associated with the mode, and the mode is determined based on the mode information in the MAC-CE. In one configuration, the mode is determined to be no frequency hopping and no beam hopping when multiple beams are determined not to be activated and the mode information indicates that there is no frequency hopping, as shown for example at 804 of FIG. 8. In one configuration, the mode is determined to frequency hopping and no beam hopping when multiple beams are determined not to be activated and the mode information indicates that there is frequency hopping, as shown for example at 808 of FIG. 8. In one configuration, the mode is determined to be no frequency hopping and beam hopping when multiple beams are determined to be activated, and the mode information indicates that there is no frequency hopping, as shown for example at 814 of FIG. 8. In one configuration, the mode is determined to be frequency hopping and beam hopping when multiple beams are determined to be activated, and the mode information indicates that there is frequency hopping, as shown for example at 818 of FIG. 8. In one configuration, the mode is determined to be frequency hopping and beam hopping with a first number of hops when multiple beams are determined to be activated, the PUCCH resource intra-slot frequency hopping configuration is enabled, the PUCCH resource starting hop PRB configuration and the PUCCH resource second hop PRB configuration indicate different PRBs, and the mode information indicates one set of frequency and beam hops, as shown for example at 820 of FIG. 8. In one configuration, the mode is determined to be frequency hopping and beam hopping with a second number of hops greater than the first number of hops when multiple beams are determined to be activated, the PUCCH resource intra-slot frequency hopping configuration is enabled, the PUCCH resource starting hop PRB configuration and the PUCCH resource second hop PRB configuration indicate different PRBs, and the mode information indicates at least two sets of frequency and beam hops, as shown for example at 822 of FIG. 8. In one configuration, as illustrated in the diagram 508, when n beams are activated, the second number of hops equals 2*n. In one configuration, the mode information indicates m sets of frequency and beam hops, and as illustrated in the diagram 510, when n beams are activated, the second number of hops equals m*n.

At 704, the UE determines whether multiple PUCCH beams are activated for the PUCCH resource. For example, 704 may be performed by frequency/beam hopping mode determination component 940 of apparatus 902. In one configuration, a MAC-CE activates one or more beams, and the UE determines whether multiple PUCCH beams are activated based on the received MAC-CE.

At 706, the UE determines a mode for frequency hopping and beam hopping for the PUCCH resource. For example, 706 may be performed by frequency/beam hopping mode determination component 940 of apparatus 902. The UE determines a mode for frequency hopping and beam hopping for the PUCCH resource based on at least one of the PUCCH resource intra-slot frequency hopping configuration, or the determination whether multiple PUCCH beams are activated. In one configuration, the mode is determined to be no frequency hopping and no beam hopping when multiple beams are determined not to be activated and the PUCCH resource intra-slot frequency hopping configuration indicates that intra-slot frequency hopping for the PUCCH resource is disabled, as shown for example at 802 of FIG. 8. In one configuration, the mode is determined to be frequency hopping and no beam hopping when multiple beams are determined not to be activated and the PUCCH resource intra-slot frequency hopping configuration indicates that intra-slot frequency hopping for the PUCCH resource is enabled, as shown for example at 806 of FIG. 8. In one configuration, the mode is determined to be no frequency hopping and beam hopping when multiple beams are determined to be activated, as shown for example at 810 of FIG. 8. In such a configuration, the mode may be determined to be no frequency hopping and beam hopping despite whether the PUCCH resource intra-slot frequency hopping configuration is enabled or disabled. Accordingly, in one configuration, the PUCCH resource intra-slot frequency hopping configuration may be enabled, and in another configuration, the PUCCH resource intra-slot frequency hopping configuration may be disabled. In one configuration, the mode is determined to be no frequency hopping and beam hopping when multiple beams are determined to be activated, and the PUCCH resource intra-slot frequency hopping configuration is disabled or the PUCCH resource starting hop PRB configuration and the PUCCH resource second hop PRB configuration indicate the same PRB, as shown for example at 812 of FIG. 8. In one configuration, the mode is determined to be frequency hopping and beam hopping with a first number of hops when multiple beams are determined to be activated, the PUCCH resource intra-slot frequency hopping configuration is enabled, and the PUCCH resource starting hop PRB configuration and the PUCCH resource second hop PRB configuration indicate different PRBs, as shown for example at 816 of FIG. 8. In one configuration, as illustrated by the diagram 508, when n beams are activated, the first number of hops equals n.

At 708, the UE transmits on the PUCCH resource based on the determined mode. For example, 708 may be performed by transmission component 934 of apparatus 902.

Figure 9:
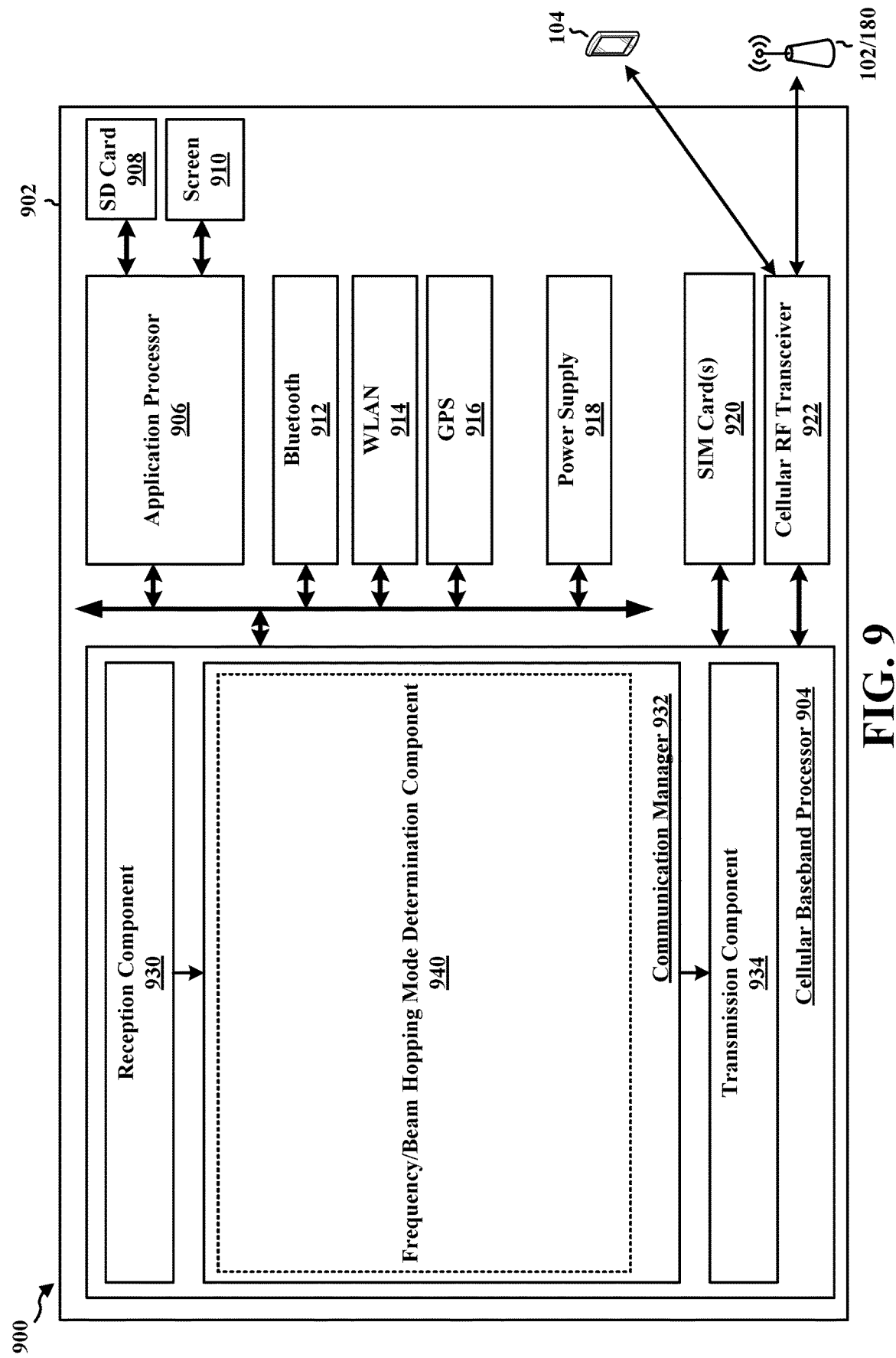
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a frequency/beam hopping mode determination component 940 that is configured to determine whether multiple PUCCH beams are activated for the PUCCH resource, e.g., as described in connection with 604 of FIG. 6 or 704 of FIG. 7. The frequency/beam hopping mode determination component 940 may be further configured to determine a mode for frequency hopping and beam hopping for the PUCCH resource, e.g., as described in connection with 606 of FIG. 6 or 706 of FIG. 7. The reception component 930 is configured to receive a PUCCH resource IE for a PUCCH resource indicating a PUCCH resource intra-slot frequency hopping configuration, e.g., as described in connection with 602 of FIG. 6 or 702 of FIG. 7. The reception component 930 may be further configured to receive a MAC-CE activating one or more beams, e.g., as described in connection with 703 of FIG. 7. The transmission component 934 is configured to transmit on the PUCCH resource based on the determined mode, e.g., as described in connection with 608 of FIG. 6 or 708 of FIG. 7.

The apparatus may include additional components that perform each of the blocks of the algorithm in the flowcharts of FIGS. 6 and 7. As such, each block in the flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for receiving a PUCCH resource IE for a PUCCH resource indicating a PUCCH resource intra-slot frequency hopping configuration. The apparatus includes means for determining whether multiple PUCCH beams are activated for the PUCCH resource. The apparatus includes means for determining a mode for frequency hopping and beam hopping for the PUCCH resource based on at least one of the PUCCH resource intra-slot frequency hopping configuration, or the determination whether multiple PUCCH beams are activated. The apparatus includes means for transmitting on the PUCCH resource based on the determined mode. The apparatus further includes means for receiving a MAC-CE activating one or more beams. The determination whether multiple PUCCH beams are activated is based on the received MAC-CE. The apparatus further includes means for receiving a MAC-CE activating multiple PUCCH beams, the determination that multiple PUCCH beams are activated being based on the received MAC-CE. The MAC-CE indicates mode information associated with the mode, and the mode is determined based on the mode information in the MAC-CE. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

As discussed supra, a UE may determine a mode in association with frequency hopping and beam hopping. The mode may be configured semi-statically through RRC signaling and/or dynamically through a MAC-CE. The apparatus may determine the mode based on the RRC signaling/MAC-CE in order to switch between different configurations of frequency and beam hopping for single-beam and multi-beam PUCCH transmissions. Different options/configurations for determining the configured mode are provided based on RRC signaling and/or the MAC-CE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a PUCCH resource IE for a PUCCH resource indicating a PUCCH resource intra-slot frequency hopping configuration; determine whether multiple PUCCH beams are activated for the PUCCH resource; determine a mode for frequency hopping and beam hopping for the PUCCH resource based on at least one of the PUCCH resource intra-slot frequency hopping configuration, or a determination whether multiple PUCCH beams are activated; and transmit on the PUCCH resource based on a determined mode.

Aspect 2 is the apparatus of aspect 1, further including a transceiver coupled to the at least one processor.

Aspect 3 is the apparatus of any of aspects 1 and 2, further includes that the PUCCH resource IE is received through RRC signaling.

Aspect 4 is the apparatus of any of aspects 1-3, further includes that the at least one processor is further configured to receive a MAC-CE activating one or more beams, wherein the determination whether multiple PUCCH beams are activated is based on the received MAC-CE.

Aspect 5 is the apparatus of any of aspects 1-4, further includes that the mode is determined to be no frequency hopping and no beam hopping when multiple beams are determined not to be activated and the PUCCH resource intra-slot frequency hopping configuration indicates that intra-slot frequency hopping for the PUCCH resource is disabled.

Aspect 6 is the apparatus of any of aspects 1-5, further includes that the mode is determined to be frequency hopping and no beam hopping when multiple beams are determined not to be activated and the PUCCH resource intra-slot frequency hopping configuration indicates that intra-slot frequency hopping for the PUCCH resource is enabled.

Aspect 7 is the apparatus of any of aspects 1-6, further includes that the mode is determined to be no frequency hopping and beam hopping when multiple beams are determined to be activated.

Aspect 8 is the apparatus of any of aspects 1-7, further includes that the PUCCH resource intra-slot frequency hopping configuration is enabled.

Aspect 9 is the apparatus of any of aspects 1-8, further includes that the PUCCH resource intra-slot frequency hopping configuration is disabled.

Aspect 10 is the apparatus of any of aspects 1-9, further includes that the PUCCH resource IE further indicates a PUCCH resource starting hop PRB configuration and a PUCCH resource second hop PRB configuration, and the mode for frequency hopping and beam hopping for the PUCCH resource is further determined based on the PUCCH resource starting hop PRB configuration and the PUCCH resource second hop PRB configuration.

Aspect 11 is the apparatus of any of aspects 1-10, further includes that the mode is determined to be no frequency hopping and beam hopping when multiple beams are determined to be activated, and the PUCCH resource intra-slot frequency hopping configuration is disabled or the PUCCH resource starting hop PRB configuration and the PUCCH resource second hop PRB configuration indicate a same PRB.

Aspect 12 is the apparatus of any of aspects 1-11, further includes that the mode is determined to be frequency hopping and beam hopping with a first number of hops when multiple beams are determined to be activated, the PUCCH resource intra-slot frequency hopping configuration is enabled, and the PUCCH resource starting hop PRB configuration and the PUCCH resource second hop PRB configuration indicate different PRBs.

Aspect 13 is the apparatus of any of aspects 1-12, further includes that when n beams are activated, the first number of hops equals n.

Aspect 14 is the apparatus of any of aspects 1-13, further includes that the at least one processor is further configured to receive a MAC-CE activating multiple PUCCH beams, the determination that multiple PUCCH beams are activated being based on the received MAC-CE, wherein the MAC-CE indicates mode information associated with the mode, and the mode is determined based on the mode information in the MAC-CE.

Aspect 15 is the apparatus of any of aspects 1-14, further includes that the mode is determined to be no frequency hopping and no beam hopping when multiple beams are determined not to be activated and the mode information indicates that there is no frequency hopping.

Aspect 16 is the apparatus of any of aspects 1-15, further includes that the mode is determined to frequency hopping and no beam hopping when multiple beams are determined not to be activated and the mode information indicates that there is frequency hopping.

Aspect 17 is the apparatus of any of aspects 1-16, further includes that the mode is determined to be no frequency hopping and beam hopping when multiple beams are determined to be activated, and the mode information indicates that there is no frequency hopping.

Aspect 18 is the apparatus of any of aspects 1-17, further includes that the mode is determined to be frequency hopping and beam hopping when multiple beams are determined to be activated, and the mode information indicates that there is frequency hopping.

Aspect 19 is the apparatus of any of aspects 1-18, further includes that the mode is determined to be frequency hopping and beam hopping with a first number of hops when multiple beams are determined to be activated, the PUCCH resource intra-slot frequency hopping configuration is enabled, the PUCCH resource starting hop PRB configuration and the PUCCH resource second hop PRB configuration indicate different PRBs, and the mode information indicates one set of frequency and beam hops.

Aspect 20 is the apparatus of any of aspects 1-19, further includes that the mode is determined to be frequency hopping and beam hopping with a second number of hops greater than the first number of hops when multiple beams are determined to be activated, the PUCCH resource intra-slot frequency hopping configuration is enabled, the PUCCH resource starting hop PRB configuration and the PUCCH resource second hop PRB configuration indicate different PRBs, and the mode information indicates at least two sets of frequency and beam hops.

Aspect 21 is the apparatus of any of aspects 1-20, further includes that when n beams are activated, the second number of hops equals 2*n.

Aspect 22 is the apparatus of any of aspects 1-21, further includes that the mode information indicates m sets of frequency and beam hops, and when n beams are activated, the second number of hops equals m*n.

Aspect 23 is a method of wireless communication for implementing any of aspects 1-22.

Aspect 24 is an apparatus for wireless communication including means for implementing any of aspects 1-22.

Aspect 25 is a computer-readable medium storing computer executable code, where the code when executed by a processor causes the processor to implement any of aspects 1-22.

What is claimed is:

1. An apparatus for wireless communication at a user equipment (UE), comprising:
a memory; and
at least one processor coupled to the memory and configured to:
receive a physical uplink control channel (PUCCH) resource information element (IE) for a PUCCH resource indicating a PUCCH resource intra-slot frequency hopping configuration;
determine whether multiple PUCCH beams are activated for the PUCCH resource;
determine a mode for frequency hopping and beam hopping for the PUCCH resource based on at least one of the PUCCH resource intra-slot frequency hopping configuration, or a determination whether the multiple PUCCH beams are activated; and
transmit on the PUCCH resource based on a determined mode.

2. The apparatus of claim 1, further comprising a transceiver coupled to the at least one processor.

3. The apparatus of claim 1, wherein the PUCCH resource IE is received through radio resource control (RRC) signaling.

4. The apparatus of claim 1, wherein the at least one processor is further configured to:
receive a media access control (MAC) control element (MAC-CE) activating one or more beams, wherein the determination whether the multiple PUCCH beams are activated is based on the received MAC-CE.

5. The apparatus of claim 1, wherein the mode is determined to be no frequency hopping and no beam hopping when the multiple PUCCH beams are determined not to be activated and the PUCCH resource intra-slot frequency hopping configuration indicates that intra-slot frequency hopping for the PUCCH resource is disabled.

6. The apparatus of claim 1, wherein the mode is determined to be frequency hopping and no beam hopping when the multiple PUCCH beams are determined not to be activated and the PUCCH resource intra-slot frequency hopping configuration indicates that intra-slot frequency hopping for the PUCCH resource is enabled.

7. The apparatus of claim 1, wherein the mode is determined to be no frequency hopping and beam hopping when the multiple PUCCH beams are determined to be activated.

8. The apparatus of claim 7, wherein the PUCCH resource intra-slot frequency hopping configuration is enabled.

9. The apparatus of claim 7, wherein the PUCCH resource intra-slot frequency hopping configuration is disabled.

10. The apparatus of claim 1, wherein the PUCCH resource IE further indicates a PUCCH resource starting hop physical resource block (PRB) configuration and a PUCCH resource second hop PRB configuration, and the mode for frequency hopping and beam hopping for the PUCCH resource is further determined based on the PUCCH resource starting hop PRB configuration and the PUCCH resource second hop PRB configuration.

11. The apparatus of claim 10, wherein the mode is determined to be no frequency hopping and beam hopping when the multiple PUCCH beams are determined to be activated, and the PUCCH resource intra-slot frequency hopping configuration is disabled or the PUCCH resource starting hop PRB configuration and the PUCCH resource second hop PRB configuration indicate a same PRB.

12. The apparatus of claim 10, wherein the mode is determined to be frequency hopping and beam hopping with a first number of hops when the multiple PUCCH beams are determined to be activated, the PUCCH resource intra-slot frequency hopping configuration is enabled, and the PUCCH resource starting hop PRB configuration and the PUCCH resource second hop PRB configuration indicate different PRBs.

13. The apparatus of claim 12, wherein when n beams are activated, the first number of hops equals n.

14. The apparatus of claim 10, wherein the at least one processor is further configured to:
receive a media access control (MAC) control element (CE) (MAC-CE) to activate the multiple PUCCH beams, the determination that the multiple PUCCH beams are activated based on the received MAC-CE, wherein the MAC-CE indicates mode information associated with the mode, and the mode is determined based on the mode information in the MAC-CE.

15. The apparatus of claim 14, wherein the mode is determined to be no frequency hopping and no beam hopping when the multiple PUCCH beams are determined not to be activated and the mode information indicates that there is no frequency hopping.

16. The apparatus of claim 14, wherein the mode is determined to frequency hopping and no beam hopping when the multiple PUCCH beams are determined not to be activated and the mode information indicates that there is frequency hopping.

17. The apparatus of claim 14, wherein the mode is determined to be no frequency hopping and beam hopping when the multiple PUCCH beams are determined to be activated, and the mode information indicates that there is no frequency hopping.

18. The apparatus of claim 14, wherein the mode is determined to be frequency hopping and beam hopping when the multiple PUCCH beams are determined to be activated, and the mode information indicates that there is frequency hopping.

19. The apparatus of claim 14, wherein the mode is determined to be frequency hopping and beam hopping with a first number of hops when the multiple PUCCH beams are determined to be activated, the PUCCH resource intra-slot frequency hopping configuration is enabled, the PUCCH resource starting hop PRB configuration and the PUCCH resource second hop PRB configuration indicate different PRBs, and the mode information indicates one set of frequency and beam hops.

20. The apparatus of claim 19, wherein the mode is determined to be frequency hopping and beam hopping with a second number of hops greater than the first number of hops when the multiple PUCCH beams are determined to be activated, the PUCCH resource intra-slot frequency hopping configuration is enabled, the PUCCH resource starting hop PRB configuration and the PUCCH resource second hop PRB configuration indicate different PRBs, and the mode information indicates at least two sets of frequency and beam hops.

21. The apparatus of claim 20, wherein when n beams are activated, the second number of hops equals 2*n.

22. The apparatus of claim 20, wherein the mode information indicates m sets of frequency and beam hops, and when n beams are activated, the second number of hops equals m*n.

23. A method of wireless communication of a user equipment (UE), comprising:
receiving a physical uplink control channel (PUCCH) resource information element (IE) for a PUCCH resource indicating a PUCCH resource intra-slot frequency hopping configuration;
determining whether multiple PUCCH beams are activated for the PUCCH resource;
determining a mode for frequency hopping and beam hopping for the PUCCH resource based on at least one of the PUCCH resource intra-slot frequency hopping configuration, or a determination whether the multiple PUCCH beams are activated; and
transmitting on the PUCCH resource based on a determined mode.

24. The method of claim 23, wherein the PUCCH resource IE is received through radio resource control (RRC) signaling.

25. The method of claim 23, further comprising:
receiving a media access control (MAC) control element (MAC-CE) activating one or more beams, wherein the determination whether the multiple PUCCH beams are activated is based on the received MAC-CE.

26. The method of claim 23, wherein the mode is determined to be no frequency hopping and no beam hopping when the multiple PUCCH beams are determined not to be activated and the PUCCH resource intra-slot frequency hopping configuration indicates that intra-slot frequency hopping for the PUCCH resource is disabled,
wherein the mode is determined to be frequency hopping and no beam hopping when the multiple PUCCH beams are determined not to be activated and the PUCCH resource intra-slot frequency hopping configuration indicates that an intra-slot frequency hopping for the PUCCH resource is enabled,
wherein the mode is determined to be no frequency hopping and beam hopping when the multiple PUCCH beams are determined to be activated.

27. The method of claim 23, wherein the PUCCH resource IE further indicates a PUCCH resource starting hop physical resource block (PRB) configuration and a PUCCH resource second hop PRB configuration, and the mode for frequency hopping and beam hopping for the PUCCH resource is further determined based on the PUCCH resource starting hop PRB configuration and the PUCCH resource second hop PRB configuration.

28. The method of claim 27, further comprising:
receiving a media access control (MAC) control element (CE) (MAC-CE) activating the multiple PUCCH beams, the determination that the multiple PUCCH beams are activated being based on the received MAC-CE, wherein the MAC-CE indicates mode information associated with the mode, and the mode is determined based on the mode information in the MAC-CE.

29. An apparatus for wireless communication, the apparatus being a user equipment (UE), comprising:
means for receiving a physical uplink control channel (PUCCH) resource information element (IE) for a PUCCH resource indicating a PUCCH resource intra-slot frequency hopping configuration;
means for determining whether multiple PUCCH beams are activated for the PUCCH resource;
means for determining a mode for frequency hopping and beam hopping for the PUCCH resource based on at least one of the PUCCH resource intra-slot frequency hopping configuration, or a determination whether the multiple PUCCH beams are activated; and
means for transmitting on the PUCCH resource based on a determined mode.

30. A non-transitory computer-readable medium storing computer executable code, the code when executed by a processor at a user equipment (UE) causes the processor to:
receive a physical uplink control channel (PUCCH) resource information element (IE) for a PUCCH resource indicating a PUCCH resource intra-slot frequency hopping configuration;
determine whether multiple PUCCH beams are activated for the PUCCH resource;
determine a mode for frequency hopping and beam hopping for the PUCCH resource based on at least one of the PUCCH resource intra-slot frequency hopping configuration, or a determination whether the multiple PUCCH beams are activated; and
transmit on the PUCCH resource based on a determined mode.

* * * * *